United States Patent
Henning et al.

(10) Patent No.: US 8,872,404 B2
(45) Date of Patent: Oct. 28, 2014

(54) FIXATING A WINDING HEAD IN A DYNAMOELECTRIC MACHINE

(75) Inventors: Holger Henning, Giengen (DE); Philipp Eilebrecht, Heidenheim (DE); Stefan Veser, Treffelhausen (DE); Thomas Hildinger, Heidenheim (DE)

(73) Assignee: Voith Patent GmbH, Heidenheim (DE)

( * ) Notice: Subject to any disclaimer, the term of this patent is extended or adjusted under 35 U.S.C. 154(b) by 203 days.

(21) Appl. No.: 13/138,625

(22) PCT Filed: Jan. 12, 2010

(86) PCT No.: PCT/EP2010/000098
§ 371 (c)(1),
(2), (4) Date: Nov. 23, 2011

(87) PCT Pub. No.: WO2010/115481
PCT Pub. Date: Oct. 14, 2010

(65) Prior Publication Data
US 2012/0068569 A1 Mar. 22, 2012

(30) Foreign Application Priority Data
Apr. 8, 2009 (DE) .......................... 10 2009 016 516

(51) Int. Cl.
*H02K 3/46* (2006.01)
*H02K 3/51* (2006.01)
(52) U.S. Cl.
CPC ........................................ *H02K 3/51* (2013.01)
USPC .......................................... 310/194; 310/260
(58) Field of Classification Search
CPC .............. H02K 3/51; H02K 3/50; H02K 3/46
USPC .......................................... 310/194, 260, 270
IPC ................................................ H02K 3/51,3/46
See application file for complete search history.

(56) References Cited

U.S. PATENT DOCUMENTS 4,782,579 A 11/1988 Rowe
5,606,212 A * 2/1997 Sasa et al. ...................... 310/270

(Continued)

FOREIGN PATENT DOCUMENTS

DE 701612 1/1941
DE 701612 C * 1/1941 ............... H02K 3/51

(Continued)

OTHER PUBLICATIONS

Machine Translation, Yoshida, JP 09131014 A, May 16, 1997.*

(Continued)

*Primary Examiner* — Quyen Leung
*Assistant Examiner* — Thomas Truong
(74) *Attorney, Agent, or Firm* — Farjami & Farjami LLP

(57) ABSTRACT

A dynamoelectric machine includes a rotor body, an annular winding head which is arranged axially next to the rotor body and coaxially in relation thereto, a support ring which is arranged radially inside the winding head and coaxially in relation thereto, the winding head and the support ring are torsion-proof with the rotor body, the winding head and the support ring are clamped together in the radial direction by tension rods which are guided through radial boreholes in the winding heads and in the support ring, where radially inner ends of the tension rods engage on the support ring and radially outer ends of the tension rods engage on bearing blocks which rest on the winding head, and the radially inner ends of the tension rods and the radially outer ends of the tension rods are mounted by the bearing blocks having a spherical surface.

1 Claim, 2 Drawing Sheets

(56) References Cited

U.S. PATENT DOCUMENTS

| | | | |
|---|---|---|---|
| 5,734,220 A * | 3/1998 | Rowe et al. | 310/260 |
| 6,762,520 B1 * | 7/2004 | Ehrhart et al. | 310/86 |
| 6,836,052 B2 * | 12/2004 | Stallone et al. | 310/260 |

FOREIGN PATENT DOCUMENTS

| | | | |
|---|---|---|---|
| DE | 195 19 127 | 9/1996 | |
| DE | 195 13 457 | 10/1996 | |
| DE | 103 10 306 | 9/2003 | |
| EP | 0 736 953 | 10/1996 | |
| GB | 1112129 | 5/1968 | |
| JP | 63-240343 | 10/1988 | |
| JP | 63240343 A * | 10/1988 | |
| JP | 02219430 A * | 9/1990 | H02K 3/51 |
| JP | 04193043 | 7/1992 | |
| JP | 0898444 | 4/1996 | |
| JP | 09131014 A * | 5/1997 | |
| JP | 09308165 | 11/1997 | |

OTHER PUBLICATIONS

USPTO Translation, Yoshida, JP 04193043, Jul. 13, 1992.*
USPTO Translation, Nishijima, JP 63240343 A, Oct. 6, 1988.*
Chinese Office Action dated Sep. 3, 2013 for Chinese Patent Application 201080014457.8.
English Translation of Chinese Office Action in Chinese Patent Application No. 201080014457.8 dated Sep. 3, 2013.

* cited by examiner

FIXATING A WINDING HEAD IN A DYNAMOELECTRIC MACHINE

This is a U.S. national phase application, which is based on, and claims priority from, PCT application Ser. No. PCT/EP2010/000098, filed Jan. 12, 2010, which claims priority from foreign application Serial No. 10 2009 016 516.9, filed Apr. 8, 2009, in Germany.

The invention relates to a dynamoelectric machine such as an electric generator. The invention especially deals with a constructional configuration of a construction by means of which the winding heads of the rotor are protected against centrifugal forces.

Such a dynamoelectric machine comprises the following components: a main rotor, annular winding heads which are arranged next to the main rotor and in coaxial relation thereto, a supporting ring which is arranged radially inside the winding heads and in coaxial relation thereto.

In order to fasten the winding heads of rotor windings it is common practice among other things to support the winding heads on the inside by an annular winding support and to fix the winding heads on said winding support with the help of bandages. Especially in the case of large machines it is also possible to use a multiply divided ring instead of a bandage, which ring rests by means of insulating intermediate layers on the winding heads and is fixed to the winding support by means of screws. Especially in the case of large centrifugal forces it is also possible to slide caps over the winding heads. Such caps are commonly used especially for fixing the winding heads of the rotor of turbogenerators (see publication "Leitfaden der Elektrotechnik" (Guide to electrical engineering), Volume 3, "Konstruktions- und Festigkeitsberechnungen elektrischer Maschinen ("Calculations for the construction and strength of electric machines"), Author: Dr. C. von Dobbeler, 1962, B. G. Teubner Verlagsgesellschaft Stuttgart, pages 25 to 29 and 58 to 62; DE 26 29 574 B2; DE-PS 7 01 612). It is further known to absorb the centrifugal forces originating from a revolving excitation coil of a synchronous machine by means of holding bridges resting on the outer face side of the excitation coil, which holding bridges are held on their part by tensioned pins which are fastened to the running body of the machine (DE-PS 9 50 659).

The object of fixing winding heads of a rotor arises especially in rotor-supplied slip-ring rotor machines as have been used recently for speed-controllable hydroelectric motor generators for pumped-storage operation. It is characteristic for such generator motors among other things that the rotor can have a diameter of 3 to 7 m. In order to fix the winding heads of such a rotor it is known to arrange holding rings on the rotor body by way of brace frames in which the ends of U-shaped tension bolts are fixed. One respective tension bolt encompasses a winding head with its U-shaped area (Report 11-104 "Development and achieved commercial operation . . . for a pumped storage power plant", 1992 CIGRE Conference, August 30 through September 5). Such a winding head fixing is very complex with regard to construction and mounting. This is also disclosed in JP-04 193043.

DE 195 19 127 C1 describes a dynamoelectric machine of the kind mentioned above. The securing device against centrifugal forces comprises tension rods which act with their, radially inside ends on the support ring and with their radially outer ends on bearing blocks which rest on the winding heads radially on the outside.

The winding heads are current flown. They are therefore heated to a higher temperature and expand. The support ring on the other hand is not current flown and therefore remains cold. In order to prevent mechanical tensions that are caused by this, cooling air is supplied to the air gap between the support ring and the winding heads, mostly from the face side of the machine. The cooling air enters the radial gap between the winding heads, flows through them in the radial direction and exits therefrom outside of the winding heads. Practice has shown that this type of cooling is insufficient.

The invention is based on the object of providing a dynamoelectric machine according to the preamble of claim 1 in such a way that on the one hand reliable protection of the winding heads against radial expansion as a result of centrifugal forces is ensured and on the other hand sufficient cooling which prevents impermissible tensions between the winding heads, the tension rods and the support ring.

This object is achieved by the features of claim 1.

Accordingly, the clearances of the boreholes in the support ring are provided with an overdimension for guiding through the tension rods. There is therefore an (annular) air gap between a tension rod and the intrados of the associated borehole in the support ring. Furthermore, the bearings of the ends of every respective tension rod are arranged in such a way that the tension rod is able to perform a limited tilting movement from the radial direction.

The tension rods extend substantially in the radial direction during non-operation of the dynamoelectric machine. Once the machine commences its operation, the winding heads will heat up as a result of the current flow and will expand in the axial direction. The support ring on the other hand will remain cold and will therefore not expand. The tension rods can follow the expansion of the winding heads because they are able to assume an inclination towards the radial direction as a result of the increased clearance of the boreholes in the support ring and an inclination towards the radial direction as a result of the respective configuration of the bearing blocks on the radially outer and the radially inner end.

The invention will be explained below in closer detail by reference to the drawings which show in detail:

Figure 1:
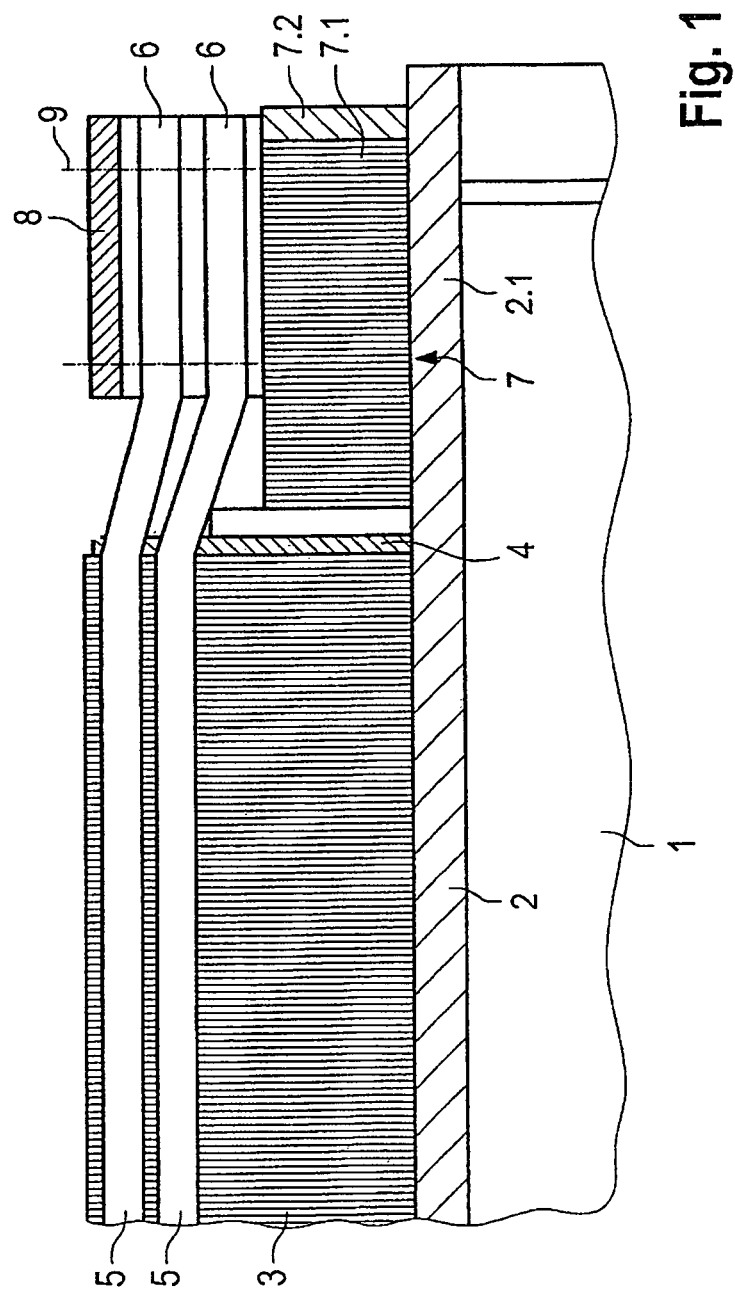
FIG. 1 shows the principal configuration of a dynamoelectric machine in a sectional view perpendicularly to the axis.

FIG. 1 shows a rotor 1 of a dynamoelectric machine. The rotor has an outside diameter which can be several meters, e.g. 5 or 6 m. A hub 2 carries a laminated rotor core stack 3. It is axially clamped by means of a pressure plate 4. Windings 5 are placed into the grooves of the laminations of the rotor. They protrude axially with the winding heads 6 out of the rotor core stack 3.

The hub is axially extended by a hub extension 2.1 for supporting the winding heads 6. The hub extension 2.1 carries a further laminated core stack 7 with laminations 7.1 and a pressure plate 7.2. The winding heads are further enclosed by an annular support body 8. It consists of several flexurally rigid plate-like ring sections. Tension bolts 9 are used for clamping together the support body 8 and the core stack 7 of the hub extension 2.1.

The illustrated embodiment is described in DE 195 19 127 C1.

Figure 2:
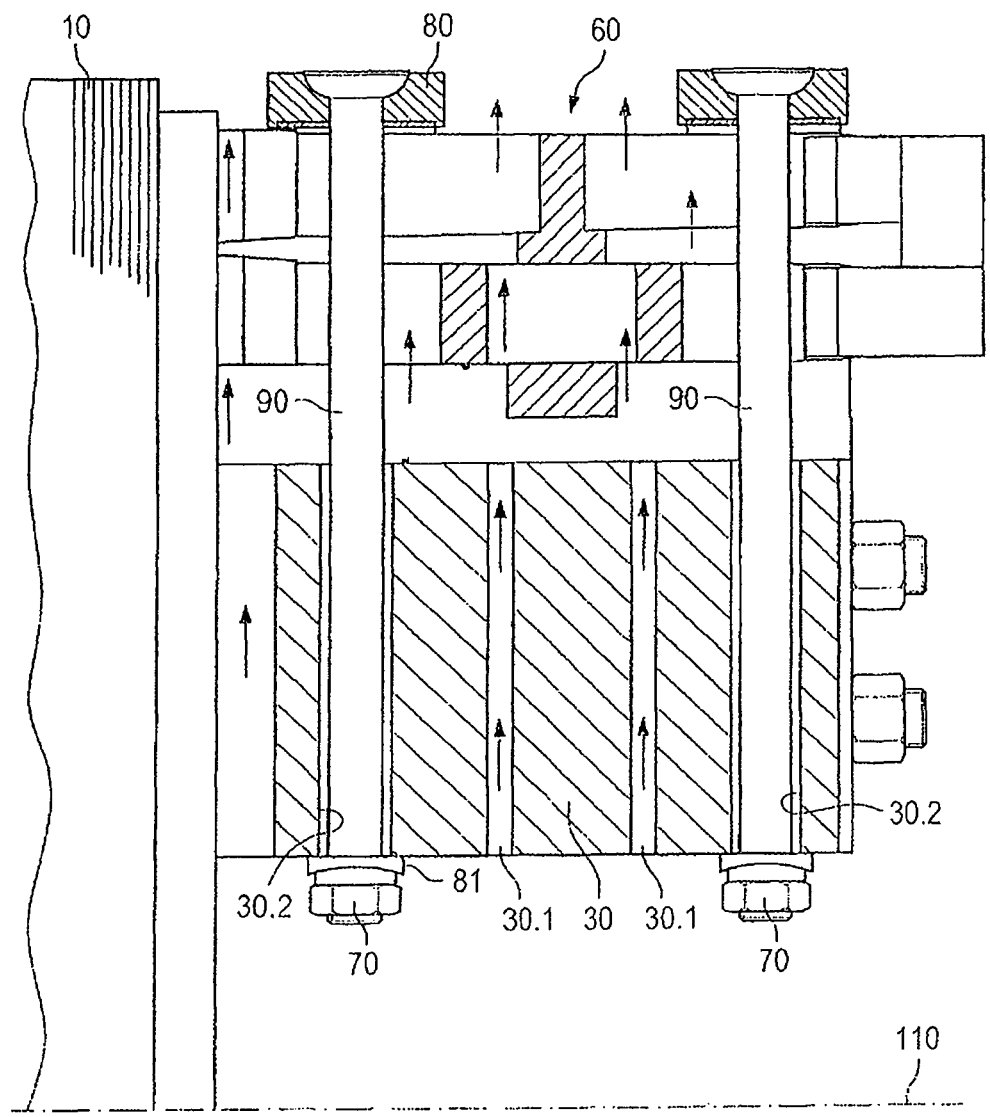
FIG. 2 shows an enlarged illustration of an axial sectional view through the end region of a dynamoelectric machine.

The embodiment according to FIG. 2 in accordance with the invention comprises a rotor body 10. An annular winding head 60 is arranged axially adjacent to the rotor body 10. It extends coaxially to the rotor body 10. The machine has a rotational axis 110.

The drawings further shows a support ring 30. The support ring 30 is laminated and is used for supporting a winding head 60. The support ring 30 is provided with venting ducts 30.1, by means of which cooling air flows in the radial direction from the inside to the outside. The support ring 30 further comprises radial boreholes 30.2. Tension rods 90 are guided through said boreholes. The radial boreholes 30.2 are provided with an overdimension with respect to the tension rods 90, which means the diameter of the tension rods 90 is smaller than the clearance of the radial borehole 30.2.

The tension rods clamp the support ring 30 and the winding head 60 together. The tension rods 90 rest with their radially outer and their radially inner ends on respective bearing blocks (also see the bearing blocks 80 and 81 and the tension nuts 70). The bearing blocks allow an inclination of the tension rods 90 in an axial plane as a result of a spherical configuration of the respective bearing surfaces.

The embodiment in accordance with the invention offers the following advantages:

In the region of the current flown winding head 16 there will be a heating and therefore an expansion in the axial direction, but not in the region of the support ring 30. The winding head 60 has the tendency to entrain the upper regions of the tension rods 90 in the axial direction, which occurs away from the rotor body 10. On the other hand, the bottom regions of the tension rods 90 remain at the same location relative to the rotor body 10. In order to take this expansion of the winding head 60 into account, the tension rods 90 are tiltable as a result of the aforementioned configuration, which means they are able to perform an axial movement in the upper region of the bearing blocks 80 away from the rotor body 10, whereas they remain stationary in the region of the bearing blocks 81. This is enabled by the two bearing blocks 80, 81 and the aforementioned overdimension of the radial boreholes 30.2 in relation to the tension rods 90.

Further constructional possibilities can be considered. The winding head 60 or its individual parts could be anchored alone for example by radial tension rods, i.e. without the tension rods passing through the winding head 60 and simultaneously through the support ring 30. The winding head 60 could be connected to the support ring 30 by one or several tension rods. Such a tension rod could act for example with its radially outer end on the radially inner region of the winding head 60, and with its radially inner region on the radially outer region of the support ring. Such a tension rod would have to be variable in respect of its length, e.g. in form of a telescopic rod. A tension spring could also fulfill this function. If such tension springs or rods of this kind are provided, the tension rods 90 would he omitted and the winding head 60 would have to be clamped together in the radial direction.

LIST OF REFERENCE NUMERALS

1 Rotor
2 Hub
2.1 Hub extension
3 Rotor core stack
4 Pressure plate
5 Windings
6 Winding heads
7 Core stack of the hub extension
7.1 Laminations
7.2 Pressure plate
8 Support body
9 Tension rods
10 Rotor body
20 Hub
20.1 Hub extension
30 Support ring
30.1 Venting ducts
30.2 Radial boreholes
40 Annular disk
60 Winding head
70 Tension nut
80 Bearing blocks
81 Bearing blocks
90 Tension rods
110 Rotational axis

The invention claimed is:

1. A dynamoelectric machine comprising:
a rotor body;
an annular winding head which is arranged axially next to the rotor body and coaxially in relation thereto;
a support ring which is arranged radially inside the winding head and coaxially in relation thereto;
the winding head and the support ring are torsion-proof with the rotor body;
the winding head and the support ring are clamped together in the radial direction by tension rods which are guided through radial boreholes in the winding heads and in the support ring, wherein clearances of the radial boreholes in the support ring are provided with an overdimension in relation to diameters of the tension rods;
wherein radially inner ends of the tension rods engage on the support ring and radially outer ends of the tension rods engage on bearing blocks which rest on the winding head;
wherein radially inner ends of the tension rods and the radially outer ends of the tension rods are mounted by the bearing blocks, wherein the bearing blocks have a spherical surface;
wherein a combination of the clearances of the radial boreholes and the spherical surface of the bearing blocks and a bearing of the radially inner ends of the tension rods on the support ring and the radially outer ends of the tension rods on the winding head allow a limited tilting movement of the tension rods against the radial direction.

* * * * *